Patented Aug. 27, 1946

2,406,627

UNITED STATES PATENT OFFICE

2,406,627
ALKAMINE DERIVATIVES OF PARA AMINOMETHYL BENZOIC ACID

Robert P. Parker, Somerville, N. J., and Arthur J. Hill, New Haven, Conn., assignors to American Cyanamid Company, New York, N. Y., a corporation of Maine No Drawing. Application April 16, 1942, Serial No. 439,236

6 Claims. (Cl. 260—472)

This invention relates to alkamine esters of substituted para aminomethyl benzoic acids.

According to the present invention it has been found that a series of alkamine esters of substituted para aminomethyl benzoic acids can be prepared some of which compounds are local anesthetics. The compounds of the present invention may be represented by the following formula:

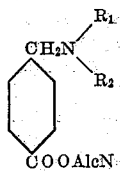

in which $R_1$ and $R_2$ are hydrocarbon radicals or part of a heterocyclic ring and Alc stands for an amino alcohol group which may be secondary or tertiary.

The products form salts such as hydrochlorides, sulfates, borates, and the like with acids or they are capable of forming quaternary salts with alkyl halides such as the methiodide, ethobromide and the like.

While the products of the present invention are not limited to any particular process of making, we prefer to prepare them from the corresponding para aminomethylbenzoyl halide by reaction with the desired amino alcohol. The para aminomethylbenzoyl halide can be prepared from the corresponding acids by thionyl halides. Some para aminomethyl benzoic acids are known in the literature such as the diethylaminomethyl compound and all of them can be prepared simply by reaction of the corresponding amines with para cyanbenzylbromide followed by hydrolysis of the cyanide group in the usual manner with acid such as hydrochloric acid. The amino alcohols which can be used in the esterification reactions of the present invention are numerous. Not only can the simple alcohols be used such as β-diethylaminoethanol, β-diethylaminopropanol, γ-diethylaminopropanol, and γ-dibutylaminopropanol but other less common amino alcohols can be employed such as dibutylaminobutanols, β,β-phenylethylaminoethanol, β-dipropylaminoethanol, β-morpholinoethanol, β-piperidinoethanol, β-dicyclohexylaminoethanol, β-methylcyclohexylaminoethanol, β-phenylaminoethanol, β,β-dimethyl-γ-piperidinopropanol and the like.

The invention will be described in greater detail in conjunction with the following specific examples which are typical illustrations. The parts are by weight.

Example 1
β-Diethylaminoethyl-p-diethylaminomethyl benzoate

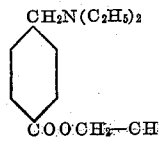

The hydrochloride of p-diethylaminomethylbenzoyl chloride is prepared by reacting diethylamine with p-cyanbenzylbromide, hydrolyzing the cyano group with concentrated hydrochloric acid to produce the hydrochloride of p-diethylaminomethylbenzoic acid and then producing the acid chloride by reacting 20 parts of the p-diethylaminomethyl benzoic acid salt with 62 parts of thionylchloride. After the reaction is completed, the excess thionyl chloride is removed by distillation under reduced pressure leaving a solid residue from which occluded thionyl chloride is washed out with petroleum ether.

10 parts of the hydrochloride of p-diethylaminomethylbenzoyl chloride prepared as described above are suspended in 50 parts of dry benzene and 16 parts of β-diethylaminoethanol dissolved in 50 parts of dry benzene are added gradually with vigorous stirring. The reaction mixture heats up and the acid chloride is progressively replaced by a flocculant solid. The reaction mixture is refluxed until the reaction is complete. The benzene is then removed from the reaction mixture by distillation and the residual paste treated with 100 parts of cold aqueous 5% sodium hydroxide solution. The product is then extracted with ether, the ether extract dried and the ether removed, leaving a residual liquid which is purified by fractional distillation under reduced pressure. At first some unchanged amino alcohol comes off at 50° C. (30 mm.) and then the pressure is dropped to about 5 mm. and a light yellow oil distills over at 192 to 195° C., the yield being in excess of 70% of the theoretical.

Example 2
γ-Diethylaminopropyl-p-diethylaminomethyl benzoate

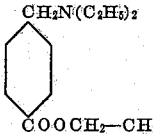

10 parts of hydrochloride of p-diethylaminomethylbenzoyl chloride prepared as described in Example 1 are suspended in 50 parts of dry benzene and 26 parts of γ-diethylaminopropanol dissolved in dry benzene are gradually added in vigorous agitation. The reaction mixture heats up and the acid chloride disappears. After addition of all of the aminoalcohol the reaction mixture is refluxed until no more reaction is evident. The benzene is then removed from the reaction mixture by distillation and the residual paste treated with 100 parts of cold aqueous 5% sodium hydroxide solution. The reaction product is then extracted with ether, the ether extract dried, and the ether removed leaving a residual liquid which is purified by fractional distillation under reduced pressure. At 70° C. (20 mm.) unchanged amino alcohol comes over. The pressure is then lowered to 3 mm. and a light yellow oil distills over at 175 to 178° C. which constitutes the alkamine ester. The yield is in excess of 80% of the theoretical.

*Example 3*

γ-Dibutylaminopropyl-p-diethylaminomethyl benzoate

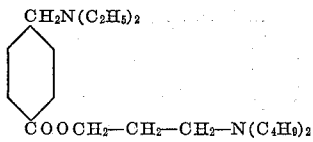

10 parts of the hydrochloride of p-diethylaminomethylbenzoyl chloride prepared as described in Example 1 is suspended in 50 parts of dry benzene. 18 parts of γ-dibutylaminopropanol dissolved in 50 parts of dry benzene are then gradually added with vigorous stirring. The reaction mixture heats up and the acid chloride disappears into solution. After all of the aminoalcohol has been added the reaction mixture is refluxed and stirred until no further reaction takes place. The benzene is then removed from the reaction mixture by distillation and the residue treated with a 5% sodium hydroxide solution. The solution is then extracted with ether, the ether extract dried and the ether removed leaving a residual liquid which is purified by fractional distillation under reduced pressure. The aminoalcohol first comes off at 102° C. (4 mm.), the pressure is then dropped to 3 mm. and p-alkamine ester distills over as a light yellow oil at 206–208° C. The yield is in excess of 70% of the theoretical.

The product is a powerful local anesthetic having an extremely low toxicity as compared with cocaine.

*Example 4*

β-Diethylaminoethyl-p-dibutylaminomethyl benzoate

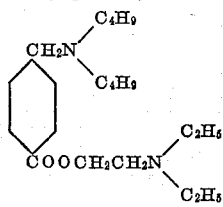

The procedure of Example 1 was followed except that the hydrochloride of p-diethylaminomethylbenzoyl chloride is replaced with a stoichiometrical equivalent of the hydrochloride of p-dibutylaminomethylbenzoyl chloride which is prepared in the same manner as the diethylamino compound using dibutylamine instead of diethylamine. A light yellow oil is obtained in high yield after discarding the unchanged aminoalcohol which distills over at a lower temperature. The yield is excellent.

*Example 5*

β-Morpholinoethyl-p-diethylaminomethyl benzoate

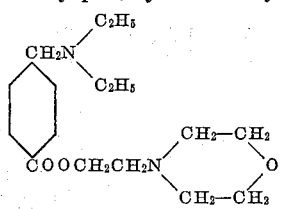

The procedure of Example 1 is followed substituting a stoichiometrical equivalent of β-morpholinoethanol for the β-diethylaminoethanol. The product is a light yellow oil which is obtained in excellent yield.

*Example 6*

β-Diethylaminoethyl-o-diethylaminomethyl benzoate

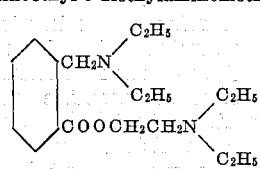

10 parts of the hydrochloride of o-diethylaminomethylbenzoyl chloride are suspended in 60 parts of ether and at gentle reflux, 11 parts of β-diethylaminoethanol in 50 parts of ether are added. After refluxing for three hours, the reaction mixture is filtered. After removal of the ether from the filtrate, the residual oil is distilled under reduced pressure. The β-diethylaminoethyl-o-diethylaminomethyl benzoate is an oil (boiling point 157°–160° C. at 4 mm.). This base is converted to the dihydrochloride salt through its solution in ether and addition of dry hydrogen chloride. The precipitated dihydrochloride is washed with dry acetone and when dry, melts at 170–174° C. The monohydrochloride is prepared by solution in an equivalent quantity of aqueous acid.

The o-diethylaminomethylbenzoyl chloride employed in the above preparation is obtained in the following manner:

20 parts of the hydrochloride of o-diethylaminomethylbenzoic acid are treated with 74 parts of thionyl chloride at 40–50° C. After filtration of the reaction mixture, the excess thionyl chloride is removed by reduced pressure distillation, and the residual liquor is poured into cold dry ether. It slowly solidifies whereupon the solid is separated by filtration. By repeated trituration in ether and filtration, the pure acid chloride is obtained.

*Example 9*

β-Diethylaminoethyl-p-diethylaminomethyl benzoate

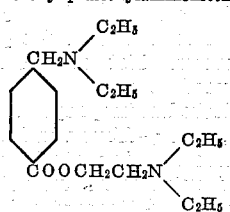

70 parts of pyridine are added to 49 parts of the hydrochloride of p-diethylaminomethyl benzoyl chloride and the mixture is chilled in an ice bath. 42 parts of β-diethylaminoethanol are slowly added with vigorous stirring, which is continued until the first strong reaction subsides. The reaction mixture is then heated to gentle reflux for a period of 2 hours, and then the temperature is lowered by stirring in an ice bath while 50 parts of water and 100 parts of ether are added to the reaction mixture. Sodium hydroxide is then added cautiously to a strong test when the solution is spotted against phenolphthalein test paper. The resulting oily mixture is extracted with ether, the ether solution being washed with fresh water, and then being dried over anhydrous sodium sulfate. After filtering off the sodium sulfate, the ether is removed by distillation and the residue is purified by distillation under reduced pressure. The resulting -diethyl-aminoethyl (p-diethylaminomethyl) benzoate when pure, boils at 162°–164° C. at 1 mm. of mercury.

The dihydrochloride salt is prepared by dissolving the free base in ether and adding dry hydrogen chloride. The precipitated dihydrochloride is dissolved in acetone-alcohol mixture, the solution is clarified, and the pure salt is precipitated by the addition of ether. It melts at 188°–193° C.

The hydrochloride of p-diethylaminomethyl benzoyl chloride employed in the above preparation is obtained in the following manner:

200 parts of p-cyanbenzyl bromide suspended in 55 parts of ether, are treated with 150 parts of diethylamine. The mixture is heated at reflux until reaction is complete, is filtered, and the ether is removed by distillation. The resulting p-diethylaminomethyl benzonitrile is purified by distillation (boiling point 120–124° C. at 1 mm. of mercury). It forms a hydrochloride salt which melts at 169–171° C.

120 parts of this nitrile are refluxed in 2500 parts of hydrochloric acid (1.19) until hydrolysis is complete, and the solution is evaporated to dryness. The residue is taken up in water, neutralized with caustic and evaporated to remove ammonia. The residue is taken up in dilute hydrochloric acid, clarified, and again evaporated to dryness. The hydrochloride of p-diethylaminomethyl benzoic acid when pure melts at 182–188° C.

50 parts of this acid and 166 parts of thionyl chloride are heated during 2½ hours up to 60° C., and heating is continued an additional hour at 70° C. The excess thionyl chloride is removed by distillation under reduced pressure. The residue is triturated with ether, filtered off and dried over silica gel. The hydrochloride of p-diethylaminomethyl benzoylchloride is ready for use in the preparation of the above ester.

The salts of the esters described in the foregoing examples may be prepared by suitable reaction with the corresponding acids. Thus the hydrochlorides are obtained by treating the esters with dry hydrogen chloride in ether solution.

In the examples the hydrochloride of the para aminomethylbenzoyl chloride is described as this is the cheapest acid halide and since the reaction proceeds smoothly with good yield there is nothing to be gained by using the corresponding bromides which work smoothly but do not present sufficient advantage to justify their higher cost.

We claim:

1. Amino alcohol esters of a p-aminomethyl-benzoic acid having the formula:

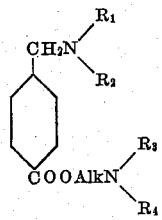

in which Alk is alkylene, $R_1$ and $R_2$ and $R_3$ and $R_4$ are members of the group consisting of lower aliphatic hydrocarbon radicals and a portion of a saturated heterocyclic ring.

2. Salts of the esters of claim 1.

3. An amino alcohol ester of p-diethylaminomethyl benzoic acid.

4. A β-diethylaminoethyl-p-diethylaminomethyl benzoate.

5. A γ-diethylaminopropyl-p-diethylaminomethyl benzoate.

6. A γ-dibutylaminopropyl-p-diethylaminomethyl benzoate.

ROBERT P. PARKER.
ARTHUR J. HILL.